Oct. 8, 1940.  C. L. COX  2,217,308
ALIGNMENT DEVICE FOR X-RAY MACHINES
Filed June 11, 1938   3 Sheets-Sheet 1

INVENTOR
CHARLES L. COX
By J. H. Weatherford
Atty

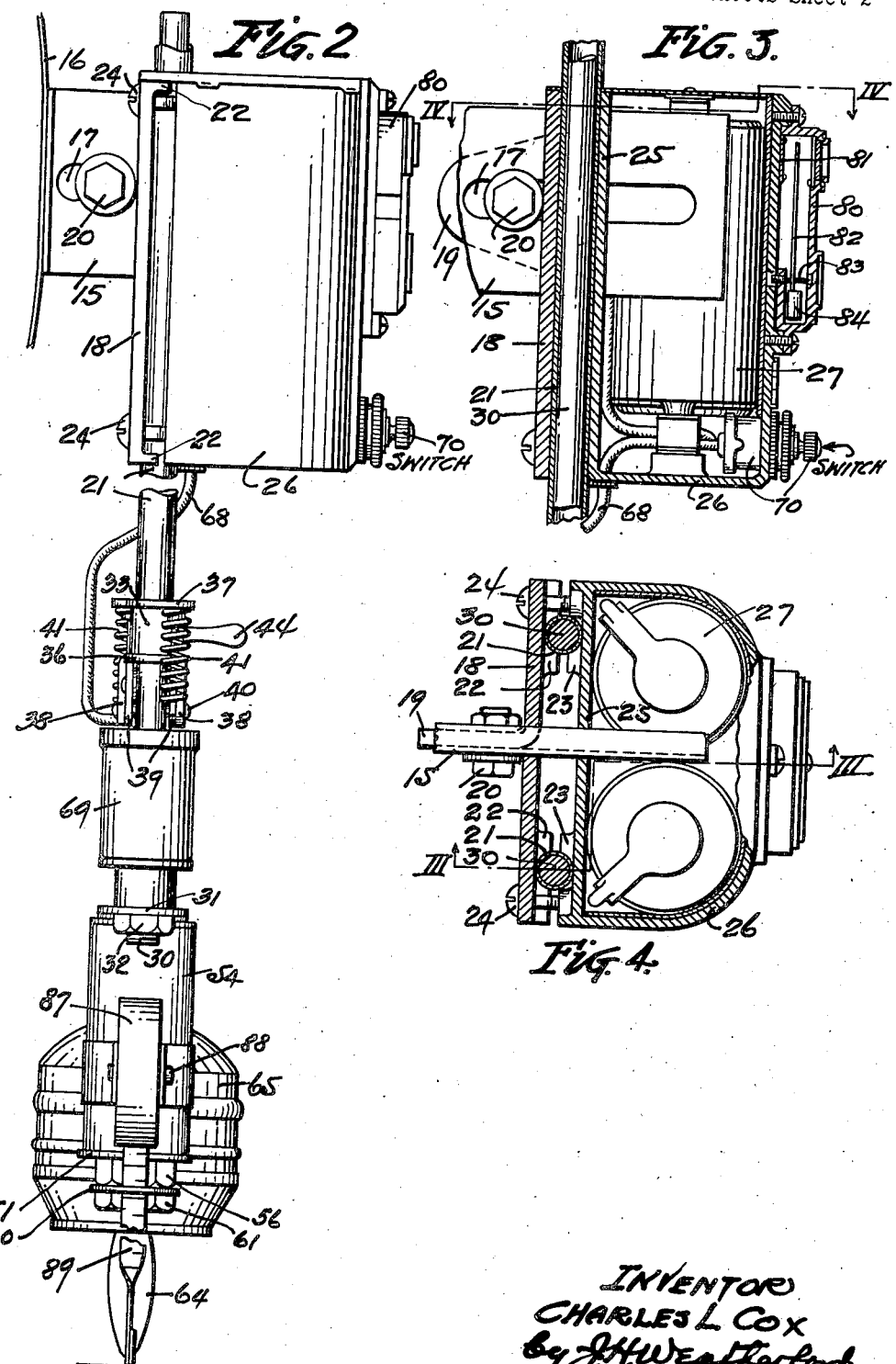

Oct. 8, 1940.  C. L. COX  2,217,308
ALIGNMENT DEVICE FOR X-RAY MACHINES
Filed June 11, 1938  3 Sheets-Sheet 3
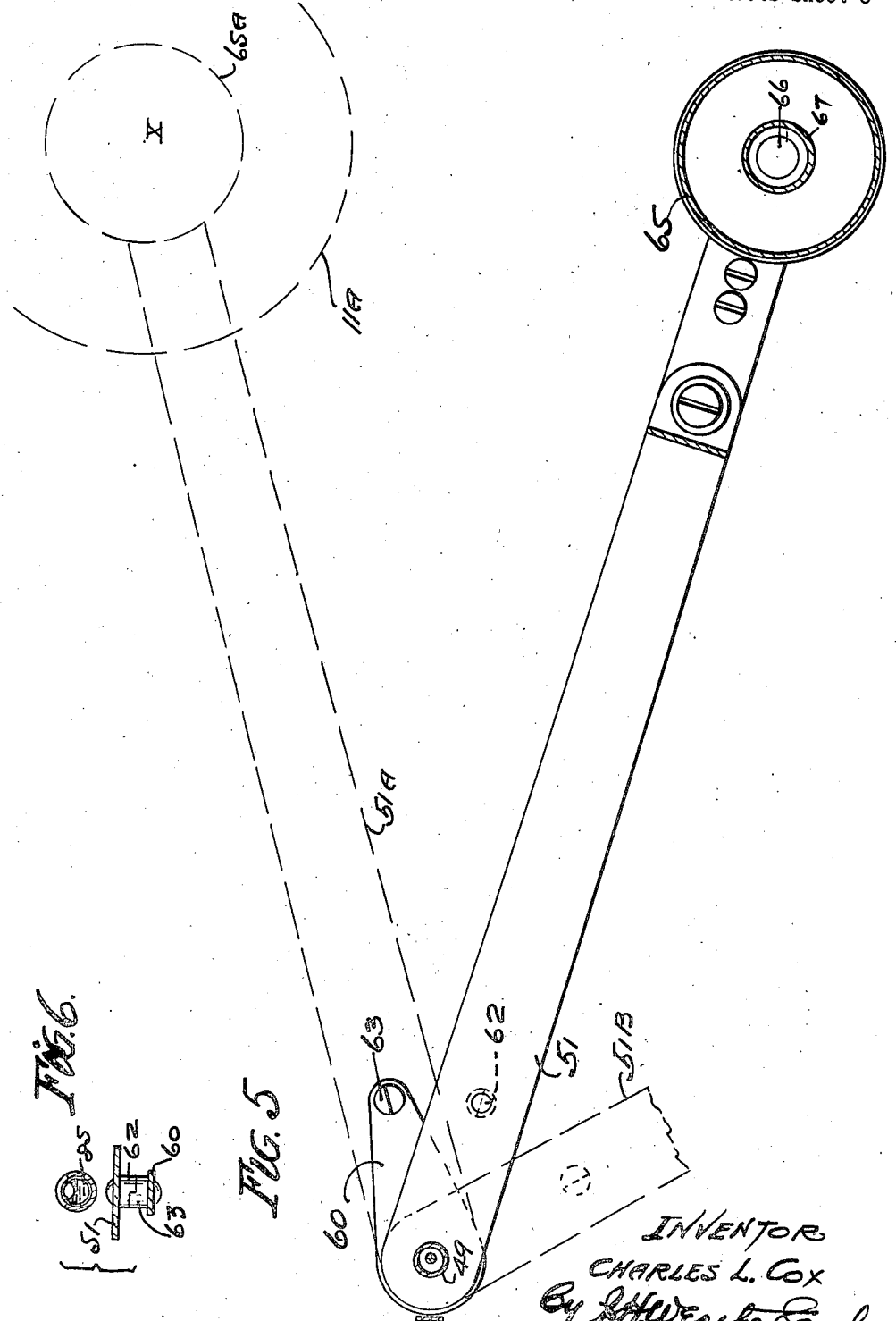

Patented Oct. 8, 1940

2,217,308

UNITED STATES PATENT OFFICE 2,217,308

ALIGNMENT DEVICE FOR X-RAY MACHINES

Charles L. Cox, Memphis, Tenn.

Application June 11, 1938, Serial No. 213,110

8 Claims. (Cl. 250—64)

This device relates to means for determining the proper positioning of an X-ray film or plate and of the object which is to be X-rayed, with reference to the X-ray apparatus and the cone of rays projected therefrom.

X-ray apparatus is usually provided with a cone or confining tube through which the rays are projected, which cone properly must be directed toward the plate, with the object to be shadowed directly interposed, but the rays projected through this tube are invisible, and the object to be X-rayed, as well as the plate on which the X-ray is made, are usually spaced at such a distance from the apparatus that extreme difficulty is often found in properly determining this direction. In such event the apparatus may not be properly positioned with reference to the object and the plate, with the result that the picture taken is distorted or even entirely fails to contain the feature which was to be shown. Also the cone used is usually of a selected length depending on conditions, or may even have to be entirely removed under some conditions, so that even this positioning help may be absent.

The objects of the present invention are:

To provide a mechanism which may be attached to the X-ray apparatus and used to visibly indicate the center of the picture which will be taken.

To provide means for visually indicating, as on the plate holder, and subsequently on the object to be X-rayed, the center of the cone of X-rays, which indicating means is movable into position for such use and thereafter movable away from such position and from interference with the subsequent use of the positioned apparatus.

To provide means for adjusting the positioning of the indicating means at varying distances away from the apparatus, and for shifting the positioning means into adjustment with the axis of the X-rays and subsequently away from interfering alignment with such rays while they are being used.

To provide means for visually indicating the angular direction of the rays through the object to be X-rayed; and To improve the design detail and construction of such apparatus.

The means by which the foregoing and other objects are accomplished and the method of their accomplishment will readily be understood from the following specification by reference to the accompanying drawings, in which:

Fig. 2 is a side elevation of the alining apparatus.

Fig. 3 is a fragmentary sectional elevation taken on the line III—III of Fig. 4 showing the battery case;

Figure 1:
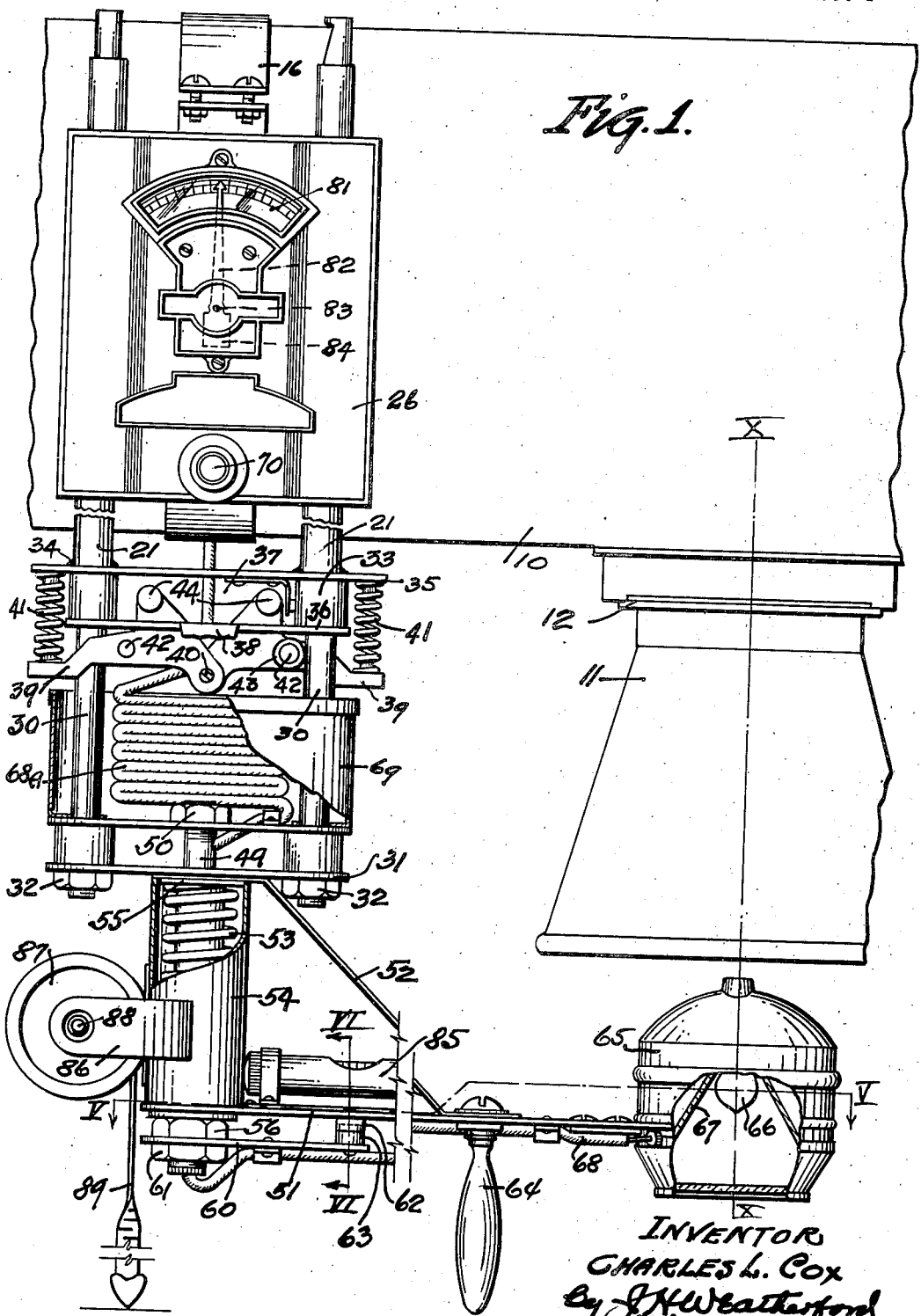
Fig. 1 is a front elevation of a fragmentary portion of a typical form of X-ray apparatus showing the ray confining tube or cone, and showing my positioning apparatus secured to the apparatus for use.

Fig. 4 a sectional plane taken on the line IV—IV of Figs. 2 and 3.

Fig. 5 is a sectional plan taken on the line V—V of Fig. 1; and

Fig. 6 a section on the line VI—VI of Fig. 1.

Referring now to the drawings in which the various parts are indicated by numerals:

The numeral 10 designates the body or casing of a typical X-ray apparatus, which body or casing encloses the X-ray tube, ray directing shield or cone, the line X—X indicating the axis of the cone of rays and the direction in which they are thrown.

The cone 11 is detachable in well known manner in such apparatus and the apparatus may be used without the cone or with cones of varying length; in other words, apparatus of this class is usually so made that the cone 11 is detachable along a joint at 12 and such apparatus is ordinarily furnished with cones of a plurality of length, the proper length of cone for the desired use being selected by the operator.

In the aligning apparatus, 15 is a bracket adapted to be secured as by a strap 16 to the casing 10. This securing means obviously is variably shaped and made to conform to such size and form of the apparatus casing as occasion may require. The bracket 15 is provided with a slot 17. 18 is a plate apertured for the passage of the bracket 15 therethrough, the plate having an integral ear 19 extending at right angles thereto and being adjustably securable by a bolt 20 which passes through this ear and the slot 17, thus providing adjustment of the plate 18 toward or away from the casing of the apparatus.

The numerals 21 designate a pair of tubes which are spaced apart substantially equal distances from the bracket 15 and are secured to the plate 18, integrally if desired, but here shown as secured between flanged portions 22 of the plate and blocks 23 by means of clamping screws 24, the flanged portions 22 and blocks 23 being notched to receive the tubes 21 and hold them in parallel alignment. The blocks 23 preferably are secured to the back 25 of a casing 26 which is adapted to hold a pair of dry cells 27.

The numerals 30 designate a pair of rods which are slidably disposed through the tubes 21. A head 31 is secured to the rods 30 by nuts 32. A head 33 is secured as by brazing 34 to the tubes 21, this head preferably including a pair of spaced plates 35, 36 and a member 37 joining these plates. 38 are ears extending from the plate 36. The numerals 39 indicate a pair of arms both of which are pivoted on a pin 40 carried by the ears 39. Compression springs 41 are interposed between the outer ends of the arms 39 and the plate 35. Pins 42 project from the arms 39, and sleeves 43 (one only being shown) of resilient material such as soft rubber or leather surrounding the pins 42 and provide frictional grips for engagement with the rods 30. The arms 39 are additionally provided with projecting members 44 which may be gripped by the fingers of an operator and moved together against the compressive action of the springs 41 to disengage the sleeves 43 from the rods 30 and permit sliding movement of these rods relatively to the sleeves 21.

A shouldered post 49, preferably hollow, is rigidly secured to the head 31, as by a clamping nut 50, and projects in an opposite direction from the projection of the rods 30. An arm 51 is turnably mounted on the post 50 and extends outward substantially at right angles thereto. 52 is a brace member secured at one end to the arm 51 and diverging therefrom toward the post 50 and the head 31, the inner end of this brace member being pivoted on the post and immediately underlying the head 31. A compression spring 53 is disposed around the post and between the arm 51 and the brace member 52, the member being sufficiently flexible to permit movement of its post end away from the post end of the arm, and the interposed spring of sufficient length and strength to accomplish this spreading. A sleeve 54 houses the spring and is adapted to limit its compression, this sleeve preferably being centered around the post by washers 55 at its opposite ends, one of these washers 55 only being shown. 56 is a nut on the bolt 50 clamping the arm-sleeve-bracket assembly frictionally against the head 31 and also holding the spring compressed. An arm guide 60 which is mounted on the post and is retained thereon by a nut 61. Nut 61 is adapted to clamp this guide against nut 56 and intended to be so tightly set up after the guide has been positioned as to retain the guide in such position during subsequent use.

A stop member 62 is carried by the arm 51 and is hereinafter designated as the arm-stop, and a complementary stop 63 on the guide 60, is hereinafter called the guide-stop. 64 is a handle for shifting the arm.

A spot light 65 is mounted on the outer end of the arm 51, this light preferably including a bulb 66, and a reflector 67 adapted to project a beam of light having substantially parallel rays. An insulated wire 68 leads to this light, the light being grounded to the arm 51 in usual manner to form the other circuit lead. The wire 68 preferably leads along the arm 51 to the post 49 and thence through this post to the battery case 26. To provide for adjusting the heads 31 and 33 apart, an excess length of the wire 68 is formed into a coil 68A between these heads, this coil preferably being housed in a cup 69 carried by the head 31. The wire 68 leads to a switch 70 within the battery casing 26, and from this switch to batteries 27, which are grounded to the casing 26, the detail of such switch and mechanism being well known, being here not further described.

As auxiliary to the apparatus, which is largely used with the tubes 21 in upright position, a casing 80 may be mounted as on the battery case 26, this casing enclosing a dial sector 81 and a pointer 82 cooperating therewith, the pointer 82 being mounted on a pivot pin 83 and caused to remain in upright position by a weight 84. Also, a level bulb 85, of usual and well known type, may be mounted on the arm 51. 86 is a bracket secured to the sleeve 54, the bracket carrying a drum 87 mounted on a pin 88 carried by the bracket. 89 is a tape mounted on the drum 87, this tape being usable for determining the distance of the X-ray tube from the plate on which the picture is to be made, or the object which is to be X-rayed.

In installing the device, the bracket 15 is securely fastened to the casing 10 of the X-ray apparatus at a distance from the center of the X-ray cone, such that the arm 51 will swing the spot-light 65 directly under the center of the cone. This is usually accomplished by detaching the cone and making the measurement from the center of the cone socket along the under side of the casing 10 to a point half-way between the guide tubes 21. Preferably the X-ray casing 10 is leveled up so that the center of the cone of ray's cast, will be exactly vertical and attachment of the bracket 15 is so made, as by use of the pointer 82 and dial 81 and the level bulb 85, that the alining apparatus is similarly exactly vertical. After the alining apparatus has been thus secured to the X-ray apparatus the nut 61 at the lower end of the post 49 is slightly loosened and the arm 51 and arm guide 60 are turned about the post until the spot-light comes directly under the center of the cone socket. In making this test it is usually found that minor adjustment of the distance between the X-ray center and the guide and post centers must be made, and this may be accomplished by loosening the clamping bolt 20 and shifting the guides 21 toward or away from the X-ray casing as may be necessary to decrease or increase the distance between centers. When the proper distance has been accomplished the spot-light is shifted around the post 49, to the exact center of the X-ray cone and the guide arm 60 is shifted to bring the guide-stop 63 against the arm-stop 62. The nut 61 is then tightened to solidly clamp the arm guide and its stop in this position, care being taken that in accomplishing this tightening no displacement of the guide-stop occurs.

In using the apparatus thus installed the arm 51 is turned about the post 49 against the restraining frictional resistance built up by the spring 53 and clamping action of the nut 56 until the arm-stop 62 and guide-stop 63 contact and limit arm movement, thus positioning the spot-light 65 in the center of the X-ray beam and the spot-light beam in alinement therewith. Current is then turned on by the switch 70, and the beam of light thrown by the spot-light indicates the exact position of the center of the X-ray beam. This light beam may be used first to center the plate holder in which the X-ray film is carried and thereafter to center that portion of the patient's body, or other object which it is desired to X-ray, over this holder. Obviously it may also be used in various other manners or sequences to accomplish the same purposes, the important item being that a visual ray is established which indicates directly the line of the center of the X-ray beam.

After the X-ray apparatus is properly positioned with respect to the object and the plate holder, the arm 51 and the spot-light are swung about the post 49 away from the line of the X- ray beam so that the picture may be taken without interference by the light apparatus. When so swung out of position, the frictional resistance established by the spring 53 and nut 56 should be sufficient to hold the arm 21 in such position as it may be moved to. Obviously with the X-ray apparatus in vertical position no difficulty is met. The apparatus, however, is usually of such type that it may be turned to throw a beam at any desired angle to the vertical or even horizontally, and in such cases the frictional resistance required is of course greater, but even in such case the arm 51 may be moved to such position with relation to the post that there is little or no turning moment, and holding be accomplished without difficulty.

Many pictures are taken with the apparatus so close to the object that a very short cone is used, or even the use of the cone is entirely dispensed with; on the other hand, much longer cones are used than are here shown. To compensate for this varying length of cone, the members 44 are grasped by the fingers loosening the grips 43, and the rods 30 carrying the post 49 and arm 51 are raised or lowered bodily to position the spot-light 65 closer to or further away from the casing 10 of the apparatus.

In Fig. 5, 11A indicates in dash lines the relative position in plan of the edge of the case with reference to the post 49—X is the axis of the X-ray. 51 shown the arm and 65 the spot-light swung out from beneath the cone with the arm-stop 62 away from the guide stop 63. 51A shows the arm swung to bring the spot-light into determining position 65A beneath the cone. 51B indicates further swing of the arm away from interference with the X-ray beam.

I claim:

1. Position determining means for an X-ray apparatus which apparatus includes beam confining and directing means; said determining means including a spot-light adapted to throw a beam of light and a source of current therefor, a pivot post, an arm, turnable about said post, supporting said spot-light with the axis of said light beam parallel to the axis of said post, a bracket carrying said post, means for securing said bracket to said apparatus with post parallel to the axis of said X-ray beam, and at equal distances from the axes of said light and X-ray beams; means for adjusting said post longitudinally relatively to said bracket, means for frictionally resisting turning movement of said arm about said post, and a stop member carried by said post and cooperating with said arm to limit turning movement of said arm when the axes of said beams are substantially coincident.

2. Position determining means for an X-ray apparatus which apparatus includes beam confining and directing means; said determining means including a spot-light adapted to throw a beam of light and a source of current therefor, a pivot post, an arm, turnable about said post, supporting said spot-light with the axis of said light beam parallel to the axis of said post, a bracket carrying said post, means for securing said bracket to said apparatus with said post parallel to the axis of said X-ray beam, and at equal distances from the axes of said light and X-ray beams; and a stop member carried by said post and cooperating with said arm to limit turning movement of said arm when the axes of said beams are substantially coincident.

3. Position determining means for an X-ray apparatus having beam directing means; said determining means including means detachably secured to said apparatus, a member off-set from the axis of said X-ray beam and carried by said detachable means, an arm pivotally supported by said member for movement in a plane at right angles to said X-ray beam, a source of light mounted on said arm to direct a light beam at right angles to said plane and being spaced from said pivot support to permit movement of said beam along a circular arc substantially passing through the axis of said X-ray beam, and means for stopping said arm with said beams in substantial coincidence.

4. Position determining means for an X-ray apparatus having beam directing means; said determining means including means detachably secured to said apparatus, a member off-set from the axis of said X-ray beam and carried by said detachable means, an arm pivotally supported by said member for movement in a plane at right angles to said X-ray beam, a source of light mounted on said arm to direct a light beam at right angles from said plane, and spaced from said pivot support to permit movement of said beam along a circular arc into substantial coincidence with the axis of said X-ray beam.

5. Position determining means for an X-ray apparatus having beam directing means; said determining means including means detachably secured to said apparatus, a member off-set from the axis of said X-ray beam and carried by said detachable means, an arm pivotally supported by said member for movement in a plane at right angles to said X-ray beam, a source of light mounted on said arm to direct a light beam at right angles from said plane and spaced from said pivot support to permit movement of said beam along a circular arc substantially passing through the axis of said X-ray beam, means for stopping said arm with said beams in substantial coincidence, and means for restraining said arm and said light source thereon clear of interference with said X-ray beam.

6. Position determining means for an X-ray apparatus having beam directing means; said determining means including a member off-set from the axis of said X-ray beam and carried by said apparatus, an arm pivotally supported by said member for movement in a plane at right angles to said X-ray beam, a source of light mounted on said arm to direct a light beam at right angles to said plane and being spaced from said pivot support to permit movement of said beam along a circular arc substantially passing through the axis of said X-ray beam, and means for stopping said arm with said beams in substantial coincidence.

7. Position determining means for an X-ray apparatus having beam directing means; said determining means including a member off-set from the axis of said X-ray beam and carried by said apparatus, an arm pivotally supported by said member for movement in a plane at right angles to said X-ray beam, a source of light mounted on said arm to direct a light beam at right angles from said plane, and spaced from said pivot support to permit movement of said beam along a circular arc into substantial coincidence with the axis of said X-ray beam.

8. Position determining means for an X-ray apparatus having beam directing means; said determining means including a member off-set from the axis of said X-ray beam and carried by said apparatus, an arm pivotally supported by said member for movement in a plane at right angles to said X-ray beam, a source of light mounted on said arm to direct a light beam at right angles from said plane and spaced from said pivot support to permit movement of said beam along a circular arc substantially passing through the axis of said X-ray beam, means for stopping said arm with said beams in substantial coincidence, and means for restraining said arm and said light source thereon clear of interference with said X-ray beam.

CHARLES L. COX.